US008983979B2

(12) United States Patent
Sauer (10) Patent No.: US 8,983,979 B2
(45) Date of Patent: Mar. 17, 2015

(54) CONTROLLING ACCESS TO STORED INFORMATION

(75) Inventor: Hermann Sauer, Ruesselsheim (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 13/349,996

(22) Filed: Jan. 13, 2012

(65) Prior Publication Data

US 2013/0185316 A1 Jul. 18, 2013

(51) Int. Cl.
*G06F 12/06* (2006.01)
*G06F 12/02* (2006.01)

(52) U.S. Cl.
CPC ........ *G06F 12/0676* (2013.01); *G06F 12/0207* (2013.01)
USPC .......................................... 707/752; 707/736

(58) Field of Classification Search
CPC . G06F 11/2084; G06F 17/30533; G06F 7/08; G06F 7/16; G06F 7/24; G06F 7/36; G06F 2207/224; G06F 2207/226; G06F 2207/228; G06F 7/38; G06F 12/0676; G06F 12/0207
USPC ................................................ 707/752, 736
See application file for complete search history.

(56) References Cited

U.S. PATENT DOCUMENTS

| 4,363,095 | A | 12/1982 | Woods et al. |
| 5,649,181 | A | 7/1997 | French et al. |
| 6,252,876 | B1* | 6/2001 | Brueckheimer et al. ...... 370/394 |
| 6,278,992 | B1 | 8/2001 | Curtis et al. |
| 7,437,371 | B2 | 10/2008 | Rathakrishnan et al. |
| 2007/0055831 | A1* | 3/2007 | Beeston et al. ............... 711/154 |
| 2008/0215936 | A1* | 9/2008 | Winter ......................... 714/710 |
| 2009/0083499 | A1* | 3/2009 | Mediratta ..................... 711/154 |
| 2011/0022802 | A1* | 1/2011 | Arsanto et al. ............... 711/122 |
| 2012/0011096 | A1* | 1/2012 | Aggarwal ..................... 707/602 |
| 2012/0047189 | A1* | 2/2012 | Staffer et al. ................. 707/830 |
| 2013/0080737 | A1* | 3/2013 | Reid ................................ 712/4 |

OTHER PUBLICATIONS

Shalev, O. et al.; "Split-ordered Lists—Lock-free Resizable Hash Tables"; Tel Aviv University: 2003; 25 pages.

* cited by examiner

*Primary Examiner* — Thanh-Ha Dang
(74) *Attorney, Agent, or Firm* — Hewlett-Packard Patent Department (57) ABSTRACT

This document describes, in various implementations, controlling access to information stored in a storage device. The information stored in the storage device is accessed in a desired order without sorting the stored information prior to access.

10 Claims, 7 Drawing Sheets

CONTROLLING ACCESS TO STORED INFORMATION

BACKGROUND

Storage devices are used to store information for later access, for example to allow processing of the stored information by an application. Processing of the information stored in the storage device may include processing the information in a specific order that is not the order in which the information is stored in the storage device. In such cases, the information may typically be sorted prior to processing.

DESCRIPTION OF THE DRAWINGS

FIGS. 3a-h are schematic representations of the data storage device of FIG. 2 showing ordered access to the data elements without prior sorting.

DETAILED DESCRIPTION

Information may be stored in a storage device as data, e.g. in the form of data elements, data records, data files, or data items. Storage devices may include, for example, a magnetic tape drive, a disk storage, an optical disc such as CD, DVD, Blu-ray Disc, a Minidisc, a hard disk drive (HDD), or a flash memory/memory card (solid state semiconductor memory), or other future data storage technologies, such as a memristor.

Data is stored at locations of the storage device that are associated with physical or virtual addresses. The data may be stored at successive addresses in the storage device, e.g. in accordance with a sequence in which the original data was stored at the device, however, even in such a situation the data may not be in a specific order, e.g. an increasing or decreasing order of its data-value. When processing the data, it may be desired to provide for an ordered access to the data. However, since the data is typically stored unordered on the storage device, the data may typically be sorted prior to processing.

Sorting may be desired in a relational database management system (RDBMS) for processing data stored in the database, e.g., in accordance with an "order by" or a "distinct" clause, i.e., to retrieve from the database system data in a desired order, or to obtain the data without duplicates. Also, it may be desired to remove duplicates from the database. Another example is a merge-join operation for combining, for example, two or more database tables on the basis of a comparison of information in at least one of the respective columns in the database tables.

Another field where sorting of data may be desirable is the field of batch and file oriented programs, for example programs handling financial data, like payments to employees, or tax information. In such programs, it may be desired to combine different data files, however, prior to combining the data files, the data stored in the data files may first need to be sorted.

Yet another field where sorting of data may be desirable is for optimizing processes, for example, processes used in network routers or in graphics applications. In a graphics application the order in which data is displayed may be determined to distinguish between foreground information and background information. In such applications, the data may need to be sorted prior to access.

When considering sorting 1 GB of data stored in a storage device of a system with 100 MB of main memory (RAM), the data is traditionally copied from the storage device to the RAM and sorted by comparing the retrieved data using the CPU. More specifically, each data element in the data set of interest is compared with most of each other data element for obtaining information, to allow access of the data by an application in the desired order. Also, it may be desired to store the retrieved data back to the storage device in the desired order. This process may be repeated several times due to the smaller size of the RAM when compared to the size of the storage device. Thus, sorting the data in the traditional manner may form a bottleneck in IT implementations, and may heavily utilize computer resources, such as the CPU, the main memory, various input/output channels, and the storage device. Also, sort methods for data stored at an external device having a size larger than the size of the main memory may traditionally include splitting the data, e.g. a file, into chunks to be sorted and merging the sorted chunks. This may result in an exponential price-performance increase with the size of the data to be sorted.

The present disclosure describes an approach for accessing data stored in a storage device that allows ordered data access to unsorted data without the need for sorting the data. In some implementations, a controller is provided for controlling access to data elements stored in a storage device, wherein the controller includes a processor which is configured to access stored data elements in a desired order without sorting the stored data elements prior to access. Also, a computer system that includes a processing unit, a storage device, and a storage device controller is described. Further, a method for controlling access to data elements stored in a storage device is also described.

The stored information may include a plurality of data elements stored in the storage device, and the processor may be configured to determine from the plurality of data elements the data element which is next in the ordered sequence, to access the determined data element, and to repeat determining and accessing until the last data element is found or until no next data element is requested.

Each data element may include a plurality of digits, each representing more than one value. For example, in the case of a binary system, the digit may have one of two values, either "1" or "0". In another system, the digit may represent various voltage levels or an electrical resistivity value used, for example, in a memory device for storing more than two memory states. Thus, a digit may have a value that is selected from more than two values.

The stored information may include a plurality of data elements stored in the storage device, and the processor may be configured to access the data elements in the ordered sequence during successive calls. During each call, a cursor may be shifted to the next data element to be accessed. Further, the data element to which the cursor is shifted may be marked such that, during a subsequent call, marked data elements that have already been found are not considered. Each of the data elements may comprise a representation comprising a plurality of digits, and during each call for each data element to be considered, the processor may be configured to pass, starting from the current cursor, all digits of the data elements to determine the data element having the largest number of consecutive predetermined values, access the determined data element, and shift the cursor to the next accessed data element.

Ordered data access to unsorted data is enabled without sorting the data. According to the techniques described here, the time to access data, for example to access a next data record in the desired order, is substantially independent of the size of the overall data so that the resource costs for sorting data may be substantially reduced.

Figure 1:
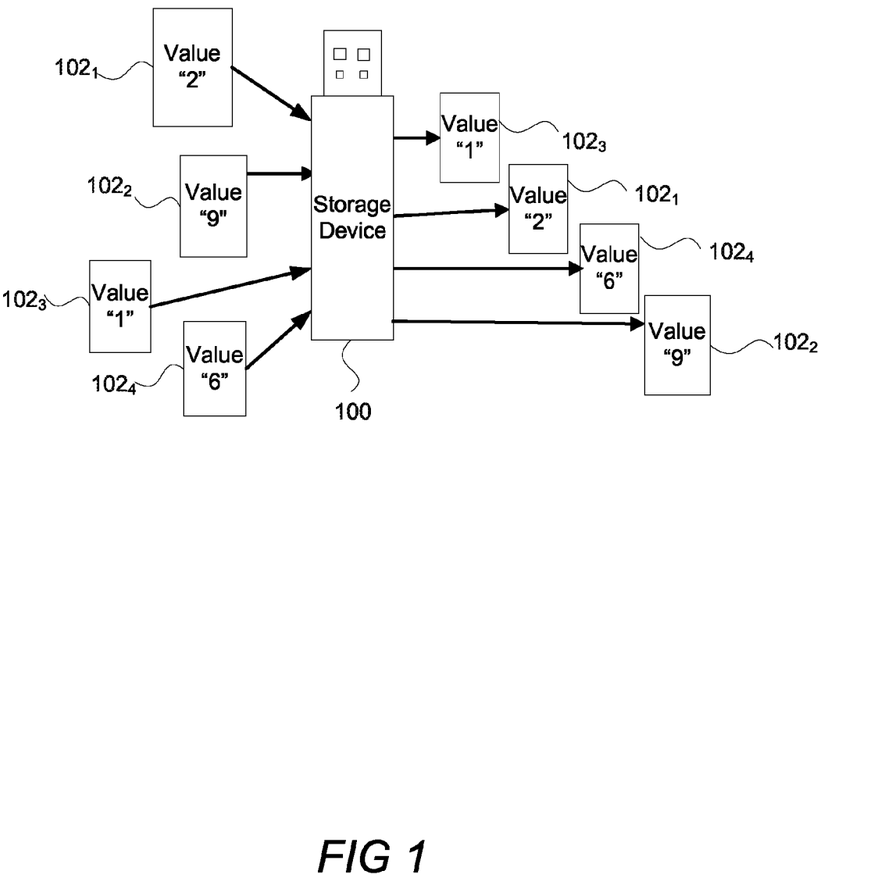
FIG. 1 is a conceptual representation of a data storage device storing a plurality of data elements.

FIG. 1 is a conceptual representation of a storage device 100 in which respective data elements $102_1$ to $102_4$ are stored, as is represented by the respective arrows pointing from the data elements $102_1$ to $102_4$ to the data storage device 100. While FIG. 1 shows a memory stick as being the data storage device 100, it is noted that any appropriate type of data storage device may be used, for example a magnetic tape drive, a disk storage, an optical disc such as CD, DVD, Blu-ray Disc, a Minidisc, a hard disk drive (HDD), or flash memory/memory card hard disks. In FIG. 1, the data elements $102_1$ to $102_4$ may have different values as indicated by the numbers associated with the data elements $102_1$ to $102_4$. Data element $102_1$ has a value "2", data element $102_2$ has a value "9", data element $102_3$ has a value "1", and data element $102_4$ has a value "6". This may be the order of the data upon storing the data into the data storage device 100. The value may be measured using any metric, for example, the value may represent the storage space occupied by the respective data element or it may represent a specific tag associated with the data element representing any information associated with the data of the data element and allowing sorting the associated data elements in accordance with a desired criterion. The data elements $102_1$ to $102_4$ may be written into the data storage device 100 in an arbitrary order, for example in an order in which they are generated or in which they are modified. For example data element $102_1$ having value "2" may be written to the data storage device 100 first, and subsequently data elements $102_2$, $102_3$ and $102_4$ may be written to the data storage device 100. Thus, the data elements $102_1$ to $102_4$ may be present in the data storage device 100 in an order of their value being "2", "9", "1", and "6".

As described above, to access the data in a desired order, for example in an increasing order, data elements $102_1$ to $102_4$ may traditionally be sorted using a sorting process that compares each of the data elements with all other data elements or already sorted data elements, thereby obtaining an indication about the order (e.g. increasing order) in which the data elements are to be accessed. In the examples of FIG. 1, the elements may be accessed in an increasing order as follows: data element $102_3$ (value "1"), data element $102_1$ (value "2"), data element $102_4$ (value "6"), and data element $102_2$ (value "9"). However, this traditional process may consume significant time and resources associated with sorting the data elements prior to actually accessing them for processing.

This overhead may be avoided by allowing ordered data access to the unsorted data without sorting the data. When a data processing unit or an application needs access to data elements $102_1$ to $102_4$ in a specified order, such as an increasing order, an ordered data access to the unsorted data $102_1$ to $102_4$ is provided by the techniques described here such that, as is shown in the right hand part of FIG. 1, data element $102_3$ having the value "1" is accessed first, as is shown by the arrow extending from device 100 to the data element 102. Then, the next larger data element $102_1$ is accessed, followed by data element $102_4$ and data element $102_2$. The same result as in the traditional process is achieved, however, the data elements are not sorted prior to the access. The data accessed in such an ordered manner may then be further processed in environments and applications mentioned above, like database environments, optimizing processes, and batch and file oriented programs.

Figure 2:
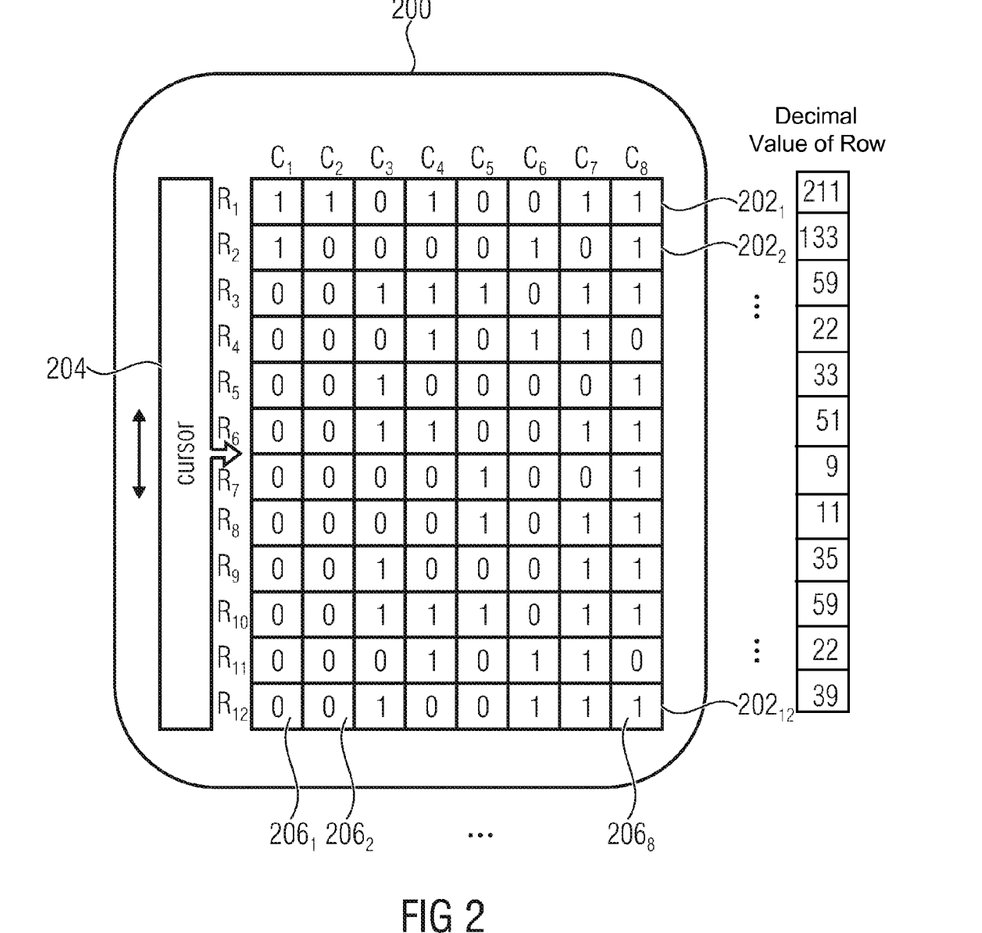
FIG. 2 is a schematic representation of a data storage device storing a plurality of data elements.

FIG. 2 is a schematic representation of a data storage device 200 holding a plurality of data elements $202_1$ to $202_{12}$. In the schematic representation of the data storage device 200 the respective data elements $202_1$ to $202_{12}$ are shown as being arranged in 12 rows $R_1$ to $R_{12}$. The data storage device 200 may include a controller (not shown) which provides for an ordered data cursor (schematically shown at 204) which, after accessing one of the data elements $202_1$ to $202_{12}$, is shifted to the next data element in the desired order. The controller may be part of the data storage device 200 or may be an external device that is operatively coupled to the data storage device 200. The data elements $202_1$ to $202_{12}$ are shown in a binary representation, i.e. each of the data elements $202_1$ to $202_{12}$ includes a plurality of digits $206_1$ to $206_8$. In the schematic representation of the data storage device 200 the respective digits $206_1$ to $206_8$ of a row $R_8$ are shown as being arranged in eight columns $C_1$ to $C_8$. A binary representation of the value at each digit is used, i.e., the value is either "1" or "0". Other examples may provide for digits $206_1$ to $206_8$ that are associated with one of two or more values, for example different values representing different voltage levels or an electrical resistivity value in a memory device that allows storage of more than two memory states. Further, a decimal representation of the values represented by the digits $206_1$ to $206_8$ of the respective data elements $202_1$ to $202_{12}$ is shown. The data elements 202 are not sorted so that when accessing subsequent storage locations (e.g. addresses) in the storage device, the data elements $202_1$ to $202_{12}$ are not accessed in a desired order, e.g. an increasing or decreasing order. The data elements $202_1$ to $202_{12}$ may be the desired data items to be accessed for further processing, alternatively, the data elements $202_1$ to $202_{12}$ may be tags associated with respective data items or data records indicating a specific value associated with the kind of information stored in the data item and may be used to determine an order of the plurality of data items having associated therewith the tags $202_1$ to $202_{12}$ in a desired order.

With reference to FIGS. 3a to 3h, an example showing ordered access to data elements without sorting them first is illustrated. In the example, it is assumed that the data elements are to be accessed in a decreasing order so that when accessing the data storage device 200 the sequence of data elements accessed is $202_1$, $202_2$, $202_3$, $202_{10}$, $202_6$, $202_{12}$, $202_9$, $202_5$, $202_4$, $202_{11}$, $202_8$, $202_7$ corresponding to decimal values 211, 113, 59, 59, 51, 39, 35, 33, 22, 22, 11, and 9.

For providing the ordered access to the data elements, the process of identifying the next data element for access may be executed several times. A processor may execute the process several times, for example by calling a routine operating in accordance with the techniques described here. The process, in accordance with an example, may use a cursor indicating the location within the data storage device 200 after access to a data element so that, when calling the routine the next time, the process may continue from the location indicated by the cursor. For example, when calling the routine for the first time, a cursor may be created and positioned at the largest data element. In addition the controller may be informed that the order is increasing or decreasing so that a corresponding increasing or decreasing cursor may be provided. During a subsequent call, the process continues from the cursor position, which may expedite execution of the process. It may be desired to access all data elements or only a sub-set of data elements in the data storage device 200. Dependent on a program or application, the routine may be called an appropriate number of times in order to access the desired set of data elements. In the following, an example for accessing all data elements is described so that the process is repeated until there is no further data element in the desired order available. However, it should be understood that fewer than all of the data elements may be accessed in a similar manner in accordance with the techniques described here.

When the routine is called or started for the first time, for accessing the data elements $202_1$ to $202_{12}$ in decreasing order, the process searches the data elements having the most leading bits which, in this example, are bits having the value "1". The process passes through one or more of the columns from left to right to find the data element having the most leading bits.

For obtaining the first data element in the desired order, the process starts at column $C_1$ and evaluates the values of the digits in the remaining columns for consecutive "1s" to determine the data element having the most leading bits ("1"). As is shown in FIG. 3a, this yields data element $202_1$ as it has the most leading bits ("1"). A pointer P is generated pointing to data element $202_1$. This pointer may be used by a program or an application for accessing data element $202_1$. Also, data element $202_1$ may be marked such that it is not considered by the process when determining the remaining data elements. Further, a cursor $210_1$ is generated (see the bold box in FIG. 3a) at row $R_1$ which comprises the two leading bits "1" in column $C_1$ and $C_2$.

For obtaining the next data element in the desired order, the process continues from the cursor $210_1$ in row R1 (shown in FIG. 3b as hatched bits). The process determines the data element having at columns $C_1$ and $C_2$ the same number of leading bits or the next lower number of leading bits when compared to the cursor $210_1$. In the depicted example there is no data element having the same number of leading bits, however, data element $202_2$ has at columns $C_1$ and $C_2$ the next lower number of leading bits "1" and thereafter "0" when compared to the cursor $210_1$. Thus, data element $202_2$ is the next smaller one, and the pointer P now points to data element $202_2$, and data element $202_2$ is marked such that it is not considered by the process when determining the remaining data elements. Further, the cursor is shifted to the location shown at $210_2$ (see the bold box in FIG. 3b). At row $R_2$ the cursor comprises the leading bit "1" in column $C_1$ and the bit "0" in column $C_2$.

Figure 3C:
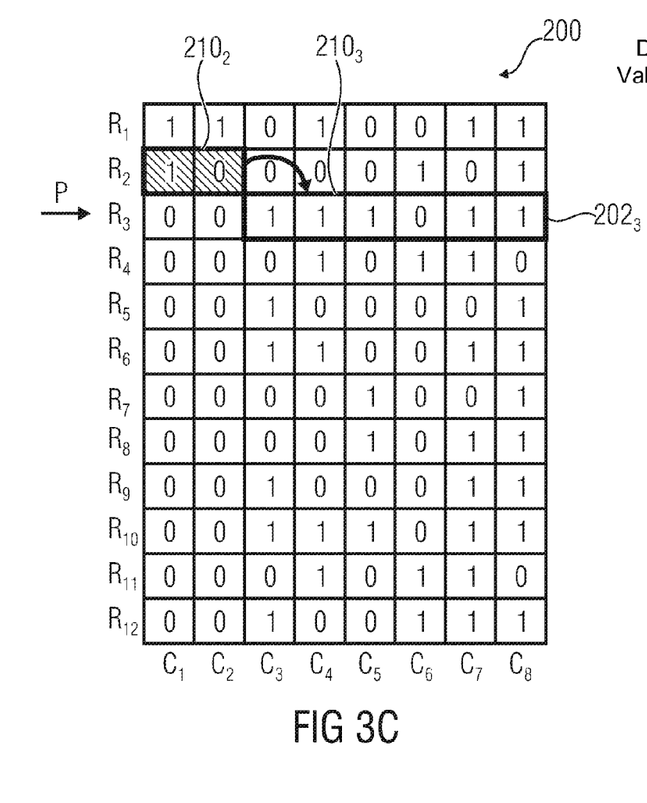

For obtaining the next data element in the desired order, the process continues from the cursor $210_2$ in row R2 (shown in FIG. 3c as hatched bits). Since the cursor $210_2$ already includes the minimum number of leading bits at columns $C_1$ and $C_2$ (all other data elements have no leading bits at columns $C_1$ and $C_2$) and since there is no other data element having the same number of leading bits, the process proceeds to the column following the last column in the cursor $210_2$ which is column $C_3$ in the depicted example. Columns $C_1$ and $C_2$ are no longer considered so that no comparisons are made in these columns so that the process is expedited. The data elements having the most leading bits "1" when starting in column $C_3$ are determined. In the example this yields two data elements $202_3$ and $202_{10}$ each having three leading bits "1". For data elements $202_3$ and $202_{10}$ also all columns to the right of the leading bit columns are evaluated to find a first column where the values are different, thereby determining which of the data elements $202_3$ and $202_{10}$ is the next smaller one. In the example shown in FIG. 3c all the remaining columns $C_6$, $C_7$ and $C_8$ have the same value which means that data elements $202_3$ and $202_{10}$ have the same value. Thus, data element $202_3$ is the next smaller one, and the pointer P now points to data element $202_3$, and data element $202_3$ is marked such that it is not considered by the process when determining the remaining data elements. Further, the cursor is shifted to the location shown at $210_3$ (see the bold box in FIG. 3c). At row $R_3$ the cursor comprises the bits "1" in columns $C_3$, $C_4$, and $C_5$, the bit "0" in column $C_6$, and the bits "1" in columns $C_7$ and $C_8$.

Figure 3D:
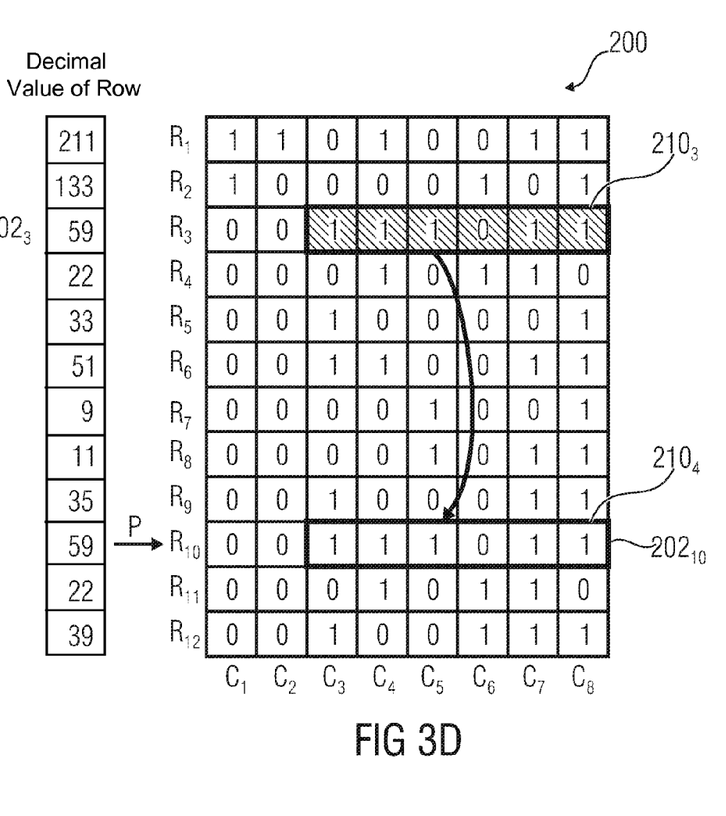

For obtaining the next data element in the desired order, the process continues from the cursor $210_3$ in row R3 (shown in FIG. 3d as hatched bits). Starting from column $C_3$ (the first column of the cursor) the process determines the data element having at columns $C_3$ to $C_5$ the same number of leading bits or the next lower number of leading bits when compared to cursor $210_3$. In the depicted example there is only data element $202_{10}$ having the same number of leading bits. Thus, data element $202_{10}$ is the next one, and the pointer P now points to data element $202_{10}$, and data element $202_{10}$ is marked such that it is not considered by the process when determining the remaining data elements. Further, the cursor is shifted to the location shown at $210_4$ (see the bold box in FIG. 3d). At row $R_{10}$ the cursor comprises the bits "1" in columns $C_3$, $C_4$ and $C_5$, the bit "0" in column $C_6$, and the bits "1" in columns $C_7$ and $C_8$.

For obtaining the next data element in the desired order, the process continues from the cursor $210_4$ in row R10 (shown in FIG. 3e as hatched bits). Starting from column $C_3$ (the first column of the cursor) the process determines the data element having at columns $C_3$ to $C_5$ the same number of leading bits or the next lower number of leading bits when compared to the cursor $210_4$. In the depicted example there is no data element having the same number of leading bits, however, data element $202_6$ at columns $C_3$ to $C_5$ has the next lower number of leading bits "1" and "1" followed by a "0" when compared to the cursor $210_4$. Thus, data element $202_6$ is the next smaller one, and the pointer P now points to data element $202_6$, and data element $202_6$ is marked such that it is not considered by the process when determining the remaining data elements. Further, the cursor is shifted to the location shown at $210_5$ (see the bold box in FIG. 3e). At row $R_6$ the cursor comprises the leading bits "1" in columns $C_3$ and $C_4$, and the bit "0" in column $C_5$.

For obtaining the next data element in the desired order, the process continues from the cursor $210_5$ in row R6 (shown in FIG. 3f as hatched bits). Starting from column $C_3$ (the first column of the cursor) the process determines the data element having at columns $C_3$ to $C_5$ the same number of leading bits or the next lower number of leading bits when compared to the cursor $210_5$. In the depicted example there is no data element having the same number of leading bits, however, data elements $202_5$, $202_9$, and $202_{12}$ have at columns $C_3$ to $C_5$ the next lower number of leading bits "1" followed by a "0" and another "0" when compared to the cursor $210_5$. For data elements $202_5$, $202_9$, and $202_{12}$ all remaining columns to the right of the leading bit columns are evaluated to find a first column where the values are different, thereby determining which of the data elements $202_5$, $202_9$, and $202_{12}$ is the next smaller one. In the example shown in FIG. 3f data element $202_{12}$ has in column $C_6$ a "1" whereas data elements $202_5$ and $202_9$ have a "0". Thus, data element $202_{12}$ is the next smaller one and the pointer P now points to data element $202_{12}$, and data element $202_{12}$ is marked such that it is not considered by the process when determining the remaining data elements. Further, the cursor is shifted to the location shown $210_6$ (see the bold box in FIG. 3c). At row $R_{12}$ the cursor comprises the bit "1" in column $C_3$, the bits "0" in columns $C_4$ and $C_5$, and the bit "1" in column $C_6$.

For obtaining the next data element in the desired order, the process continues from the cursor $210_6$ in row R12 (shown in FIG. 3g as hatched bits). Starting from column $C_3$ (the first column of the cursor) the process determines the data element having at columns $C_3$ to $C_5$ the same number of leading bits or the next lower number of leading bits when compared to the cursor $210_6$, and at column $C_6$ a different bit when compared to the cursor $210_6$. In the depicted example there are data elements $202_5$ and $202_9$ having the same number of leading bits and a different bit at column $C_6$. For data elements $202_5$ and $202_9$, the remaining columns right of the last column $C_6$ of the cursor $210_6$ are evaluated to find a first column where the values are different, thereby determining which of the data elements $202_5$ and $202_9$ is the next smaller one in the order. In the example shown in FIG. 3g data element $202_9$ has in column $C_7$ a "1" whereas data elements $202_5$ has a "0". Thus, data element $202_9$ is the next smaller one, and the pointer P now points to data element $202_9$, and data element $202_9$ is marked such that it is not considered by the process when determining the remaining data elements. Further, the cursor is shifted to the location shown $210_7$ (see the bold box in FIG. 3g). At row $R_9$ the cursor comprises the bit "1" in column $C_3$, the bits "0" in columns $C_4$, $C_5$ and $C_6$, and the bit "1" in column $C_7$.

For obtaining the next data element in the desired order, the process continues from the cursor $210_7$ in row R9 (shown in FIG. 3h as hatched bits). Starting from column $C_3$ (the first column of the cursor) the process determines the data element having at columns at columns $C_3$ to $C_5$ the same number of leading bits or the next lower number of leading bits when compared to the cursor $210_7$, at column $C_6$ the same bit as in the cursor $210_7$, and at column $C_7$ a different bit when compared to the cursor $210_7$. In the depicted example there is data element $202_5$ have the same number of leading bits until column $C_6$, and a different bit at column $C_7$. Thus, data element $202_5$ is the next smaller one, and the pointer P now points to data element $202_5$, and data element $202_5$ is marked such that it is not considered by the process when determining the remaining data elements. Further, the cursor is shifted to the location shown $210_8$ (see the bold box in FIG. 3h). At row R5 the cursor comprises the bit "1" in column $C_3$, and the bits "0" in columns $C_4$ to $C_7$.

For obtaining the remaining data elements, the above described steps are repeated. Continuing with the example above, all leading bits starting in column $C_3$ have been processed so that in subsequent steps, only the leading bits starting in column $C_4$ and further columns are considered. In the manner described above, pointer P subsequently points to data elements $202_4$, $202_{11}$, $202_8$ and $202_7$.

Thus, by means of the above process, the cursor is consecutively shifted to the data elements in accordance with the desired order (e.g., in a decreasing order), thereby allowing ordered access (via the pointer) to the data elements without sorting them beforehand.

While FIG. 3 describes an example on the basis of data elements having a binary representation of the digits for obtaining an ordered access in a decreasing order, it is noted that the same principles apply for accessing the data elements in an increasing order that starts from data element $202_7$. In that case, the predetermined value is not "1" but is "0". First, the largest number of leading bits, now "0"s, is determined yielding data elements $202_7$ and $202_8$. From data elements $202_7$ and $202_8$, the maximum number of consecutive "0"s are determined following the column where for the first time the "1" was determined, namely following column $C_4$, which yields data element $202_7$ as the smallest data value and the cursor is shifted to this data element, and the data element is marked such that is it not considered when determining the remaining data elements.

In another example it is also possible to find the smallest data element by applying the process as described above with regard to FIG. 3 and to proceed then from this data element. For the remaining data elements the process is called again and repeated as described above. After the first data element is found, instead of evaluating the columns to the right of the leading bits, now the columns to the left are evaluated, thereby yielding the increasing order of data elements without the need for sorting them beforehand.

It is noted that despite the binary representation of the digits in the example, any other appropriate representation is possible, for example a representation where the respective digits have associated therewith a value selected from more than two different values. Also, an octal, a decimal, or a hexadecimal representation is possible. A digit may represent any appropriate number of values, not only the just mentioned 2, 8, 10 or 16 values.

As described with regard to FIG. 3, by traversing column-wise from left to right, it is possible to find the next lower value without the need to compare one value with each other value in the total record set. While traditional approaches of sorting the data prior to access may cycle the data multiple times through a cache/working memory of the CPU, which executes the data comparisons, the techniques described here may be implemented, for example, at a hardware level inside the storage device for forming an internal controller, or at a device controller level, like a device controller which is part of an overall computer system.

While, at a first glance, it may appear that the efforts for finding the next data element according to the techniques described here is high, it is to be noted that the contrary is true because the above described column-wise searching for the next data element is more efficient than comparing the entire set of data elements with each other. For example, the higher efficiency is obtained because up to a specific granularity of the digit (smallest memory element on the hardware level) it is possible to implement this column-wise approach on the electrical level. On this level the comparison may be done very quickly by evaluating the different voltage or resistance values.

For example, in a flash memory or a SSD memory a plurality of bits may be evaluated at the same time. An example for a flash memory or a SSD memory allowing for such a functionality are memory devices using floating gates.

When comparing the digits column-wise (as described above), e.g. in a storage controller, less comparison operation are necessary when compared to approaches requiring that all or almost all data elements are compared with each other.

When implementing the process on a hardware level and expanding the functionality of the storage controller to implement the comparison in the storage controller, the overhead of transferring the data elements to the CPU for the comparison may be avoided.

As is described, there is no need to sort the data before access so that an ordered access to the data is achieved. For example, ordered access to the data is always available for each and every table and column in a database table or the like. A database system may implement ordered serial access to the data so that the need for sorting the data is no longer needed and thereby, for example, an even faster merge-join of the files/database tables may be executed between tables. In case a DBMS still needs sorting, for example, for building up a B-Tree for a direct record access, the DBMS may use the above approach to build up the B-Tree directly which is much faster.

The process using the cursor may be implemented at a flash/SSD like storage-hardware level, for example by shifting the cursor by stepping from the highest charges or resistance value of all FGMOS (Floating Gate MOS) to the lowest charges or resistance value. Alternatively, the implementation may be at the storage controller level by shifting the relevant values first from the storage-hardware into a special FGMOS based hardware which enables them to shift the cursor step by step to the next lower resistance value.

Figure 4:
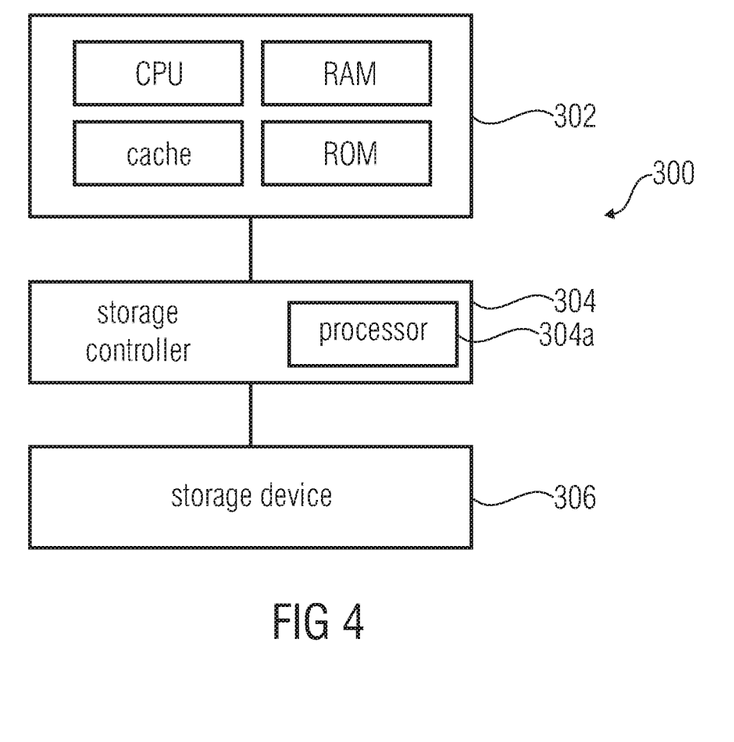
FIG. 4 is a schematic representation of a computer system in accordance with an embodiment.

FIG. 4 is a schematic representation of a computer system 300 in accordance with an embodiment and comprising a processing unit 302 which may include at least one CPU, at least one cache memory associated, a read only memory (ROM) for holding, for example, program information about an operating system or the like, and a main memory (RAM). Further, a storage device controller 304 is provided as well as a storage device 306, wherein the storage device controller 304 is provided for controlling access to the storage device upon request by the processing unit 302 and for providing ordered access to data elements stored in the storage device 306. The storage device controller 304 may comprise a processor 304a configured to operate in a way a described above. The processing unit 302 may comprise further elements, for example I/O modules, peripheral connection modules, user interfaces and the like. Alternatively, the controller 304 may be implemented as part of the storage device 306 or may be part of the processing unit 302. The controller 304 and storage device 306 may be directly connected to the central computer 302 (Direct Attached Storage (DAS)) or by any kind of network connection like SAN (Storage Area Network) or NAS (Network Attached Storage).

Although some examples have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Examples may be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

A data carrier may be provided having electronically readable control signals, which are capable of cooperating with a programmable computer system, such that one of the methods described herein is performed.

Generally, a non-transitory computer program product with a program code may be provided, the program code being operative for performing one of the methods when the computer program product runs on a computer. The program code may for example be stored on a machine readable carrier. The non-transitory computer program for performing one of the methods described herein may be stored on a machine readable carrier.

Further a processing unit may be provided, for example a computer, or a programmable logic device, which is configured to or adapted to perform one of the methods described herein. A computer may have installed thereon the computer program for performing one of the methods described herein. Also a programmable logic device such as a FPGA (field programmable gate array) or an AISIC (application specific integrated circuit) may be used to perform some or all of the functionalities of the methods described herein. A field programmable gate array may cooperate with a microprocessor in order to perform one of the methods described herein. Generally, the methods may be performed by any hardware apparatus.

It is understood that modifications and variations of the arrangements and the details described herein will be apparent to others skilled in the art. It is the intent, therefore, to be limited only by the scope and spirit of the following claims and not by the specific details presented by way of description and explanation of the embodiments herein.

What is claimed is:

1. A controller for controlling access to information stored in a storage device, the controller comprising:
a processor to access in successive calls each of a plurality of data elements stored in a storage device in an order, wherein each of the plurality of data elements comprises a plurality of digits, each digit of the plurality of digits having a value, and wherein during each successive call the processor is to:
analyze, starting from a current cursor, the digits of each of the plurality of data elements to determine a data element having digits having a largest number of consecutive predetermined values;
access the determined data element having digits having the largest number of consecutive predetermined values; and
shift the cursor to the accessed data element.

2. The controller of claim 1, wherein the processor outputs a pointer to each of the accessed data elements to allow further processing of the accessed data elements.

3. The controller of claim 2, wherein the processor is to at least one of modify, read, and delete the accessed data elements.

4. The controller of claim 1, wherein the data element to which the cursor is shifted is marked and is not analyzed during a subsequent call.

5. The controller of claim 1, wherein, in response to a determination that more than one data element is determined to have the largest number of consecutive predetermined values, the processor is to evaluate remaining digits of the determined data elements to access the data elements in accordance with the order.

6. The controller of claim 1, wherein a digit of the plurality of digits has a value selected from two or more values.

7. A computer system comprising:
a processing unit;
a storage device; and
a storage device controller, the storage device controller for controlling access to information stored in the storage device and comprising a processor that accesses a plurality of data elements stored in the storage device in a desired order without sorting the plurality of data elements prior to access, wherein each of the data elements comprise a plurality of digits, and the desired order is based on values of the digits of the plurality of data elements, and to access the plurality of data elements in the desired order, the storage device controller is to:
determine, from the plurality of data elements, a next data element in an ordered sequence to access based on the values of the digits of the next data element, wherein to determine the next data element, the storage device controller is to analyze, starting from a current cursor, the digits of each of the plurality of data elements to determine a data element having digits having a largest number of consecutive predetermined values;
access the next determined data element in the ordered sequence having digits having the largest number of consecutive predetermined values;
shift the cursor to the accessed data element; and
repeatedly determine and access a next data element until all desired data elements in the ordered sequence are accessed.

8. A method for controlling access to information stored in a storage device, the method comprising:
accessing in successive calls each of a plurality of data elements stored in a storage device in an order, wherein each of the plurality of data elements comprises a plurality of digits, each digit of the plurality of digits having a value, and wherein during each successive call the method includes:

analyzing, starting from a current cursor, the digits of each of the plurality of data elements and determining a data element having digits having a largest number of consecutive predetermined values;

accessing the determined data element having digits having the largest number of consecutive predetermined values; and shifting the cursor to the accessed data element.

9. The method of claim 8, comprising marking the data element to which the cursor is shifted and not analyzing marked data elements during a subsequent call.

10. The method of claim 8, wherein, determining a data element having digits having a largest number of consecutive predetermined values comprises:

if more than one data element is determined to have digits having the largest number of consecutive predetermined values, evaluating the remaining digits of the determined data elements to access the data elements in accordance with the order.

* * * * *